United States Patent

[11] 3,613,927

| [72] | Inventors | Claude Carlier<br>Montreuil S/Bois;<br>Andre Gravez, Montigny-les-Cormeilles,<br>both of France |
|---|---|---|
| [21] | Appl. No. | 855,115 |
| [22] | Filed | Sept. 4, 1969 |
| [45] | Patented | Oct. 19, 1971 |
| [73] | Assignee | Saunier Duval |

[54] SYSTEMS FOR LOADING AND UNLOADING ELEVATORS
17 Claims, 8 Drawing Figs.

[52] U.S. Cl. .................................................. 214/622, 198/177, 214/95
[51] Int. Cl. .................................................. B65g 17/16
[50] Field of Search .......................................... 214/95, 623, 625, 622; 198/177

[56] References Cited
UNITED STATES PATENTS
746,247  12/1903  Baggaley ..................... 214/16.4
FOREIGN PATENTS
1,455,871  9/1966  France .......................... 214/625

Primary Examiner—Gerald M. Forlenza
Assistant Examiner—Lawrence J. Oresky
Attorney—Kenway, Jenney & Hildreth

ABSTRACT: An automatic loading and unloading device for an elevator of the paternoster type in which an endless chain is provided with a number of load supporters spaced along its length. The chain is driven in a vertical plane so that the load supporters may be driven vertically past spaced loading and unloading stations such as when transferring a load between different stories of a building. Each station includes mechanism for transferring a load between the station and the load supporters on the chain. Each such mechanism is actuable in response to the presence of a selected load carried by the chain.

Fig 3.

SYSTEMS FOR LOADING AND UNLOADING ELEVATORS

SUMMARY AND BACKGROUND OF THE INVENTION

Our invention relates to material handling systems and more particularly to a system for the automatic loading and discharging of a continuous elevator at fixed stations along the path of travel of the elevator. The handling of loads between different levels, particularly the conveying of documents between floors of a building, may be effected by elevators consisting of one or two endless chains which are driven continuously and which support, at regular intervals, catching rockers which engage the boxes or other containers to be transported. When the catching rockers are not supporting a box and are in an inoperative position, they extend normally to the chain so that when the chain is driven vertically past a loading station the rocker arm will protrude toward the station and will engage and catch a box placed at the loading station in readiness to be picked up by the elevator. Once the box has been retrieved its weight rotates the rocker to a substantially vertical position with the box hanging from the rocker arm.

Among the arrangements proposed in the prior art to unload a supported box from the chain is to provide a discharge ejector mechanism in association with each rocker, each discharging ejector being fixed to the chain and being actuable by a retractible cam located at each transfer station. This arrangement, shown in French Pat. No. 1,455,871, is suited particularly to the handling of light loads between a small number of transfer stations, and has some disadvantages when employed to transfer heavier loads or when a large number of transfer stations are required. Among these disadvantages is that the total weight of the discharging ejectors, which must be carried by the chain, is rather large. Additionally, the transfer of relatively heavy loads causes a greater reaction on the chain. Furthermore, the loads of the boxes may vary and the position of the center of gravity of the loads also may vary which may result in oscillation of the boxes.

Our invention overcomes a number of the foregoing difficulties by employing a continuous elevator of the paternoster type having load-supporting rockers attached to the chain at predetermined intervals for supporting the boxes during travel. An individual transfer mechanism is associated with each transfer station and is secured in a fixed position to the frame of the building at each transfer station. Each transfer mechanism includes a pivotable arm supported on the fixed frame of the elevator or building. The arm may be pivoted into the path of a descending rocker which suspends the box to be discharged. Engagement of the pivoted arm with the rocker causes the rocker to rotate toward the transfer station and move the supported box laterally to the discharging station. The rocker then releases the box. The invention now will be described in greater detail with reference to the accompanying drawings wherein:

FIG. 8 shows a view of the same discharging station in the last phase of operation of the safety device. The elevator, shown diagrammatically in FIG. 1, includes a pair of parallel, endless chains 1. The chains are driven by a motor (not shown) so that the vertically disposed ascending and descending runs may be driven past and serve a plurality of levels or floors of a building. A number of rockers, which are intended to support and transfer containers or boxes 3, are mounted at regular intervals to the endless chains 1. The chains 1 are carried by a pair of upper sprockets or wheels (not shown) which are rotated about a shaft 6 which also serves to support and drive the chains. The chains are returned over a pair of lower sprockets (not shown) arranged in the usual manner. The chains 1 are driven endlessly in the direction indicated by the arrow so that the rockers 2 may engage the containers 3 along the ascending run and then descend past the discharging stations at each story of the building. In FIG. 1 two such successive stories are shown in phantom and are indicated generally by the reference characters 4 and 5. Vertical ducts may be provided to receive the runs of the chains 1 and the transported boxes 3. Additionally, guide rails may be provided in the ducts. An aperture is provided in the duct at each story to enable loading or unloading of the containers 3 onto the chains 1.

Figure 4:
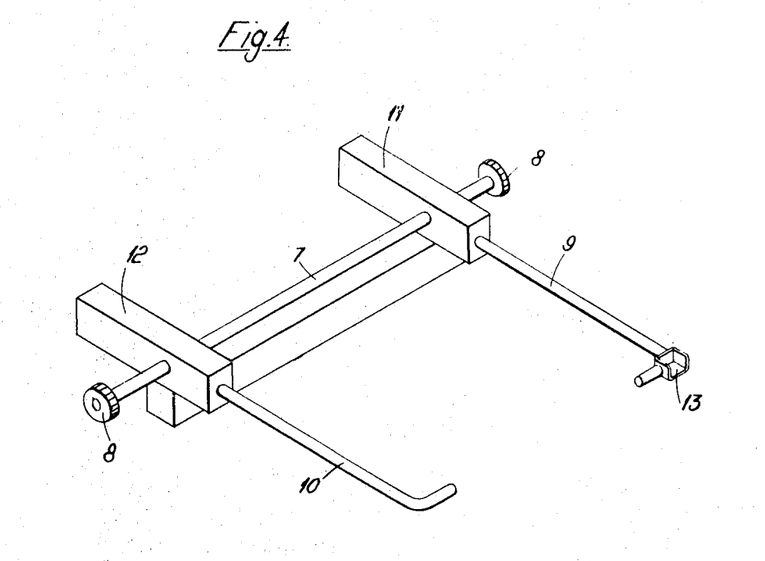
FIG. 4 shows a diagrammatic, perspective view of a rocker of the elevator shown in FIG. 1.
Figure 5:
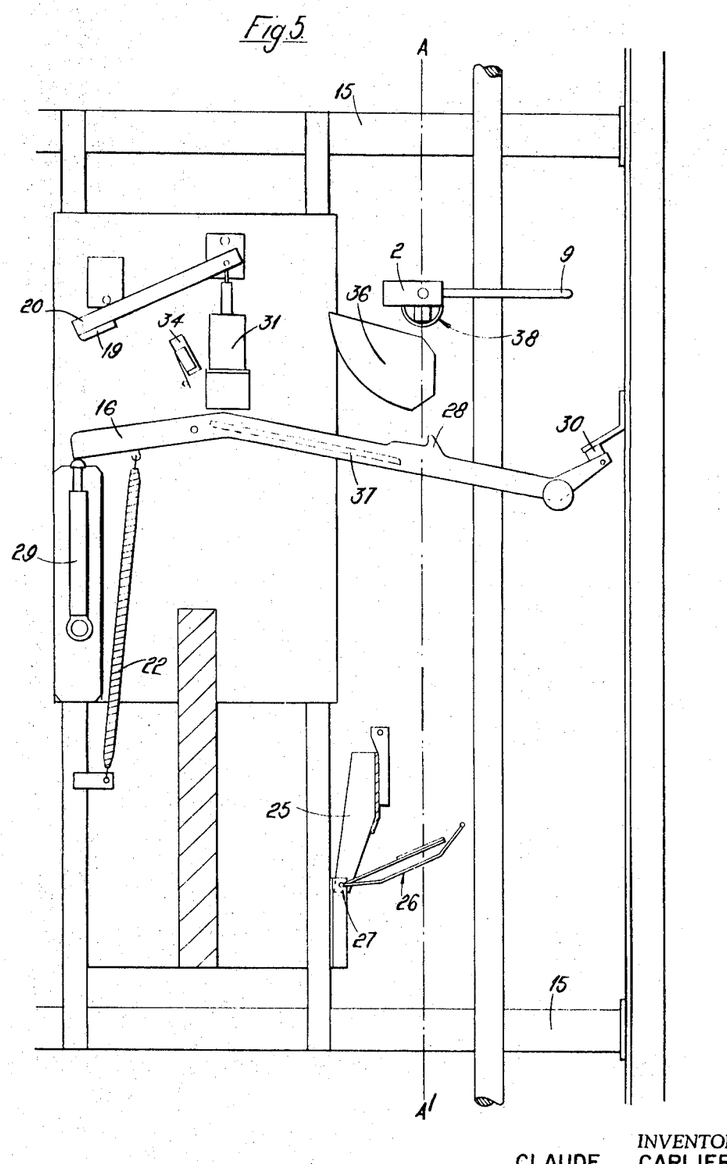
FIG. 5 shows a diagrammatic sectional view of a discharging station including the modification of a safety device.

The rockers 2 are mounted to the chains 1 by means of shafts 7. The ends of the shafts protrude laterally beyond the chains 1 and wheels 8 as shown in FIG. 4, are attached rotatably to the ends of the shafts and are received in guide rails (not shown) which the wheels roll and are guided. As shown in FIG. 4, the rockers 2 comprise the parallel arms 9 and 10 which are fastened to counterweights 11 and 12, the counterweights in turn being journaled on the shaft 7. The ends of the arms 9 and 10 are bent at right angles towards one another and the bent ends are intended to engage and catch the containers 3. The end of the arm 9 has a cup-shaped member secured thereto for a purpose later described.

The boxes 3 which carry the loads are of a generally rectangular shape and include laterally projecting loops 14 which are intended to be engaged by the arms 9 and 10 of the rocker 2 to lift and convey the boxes 3.

Figure 2:
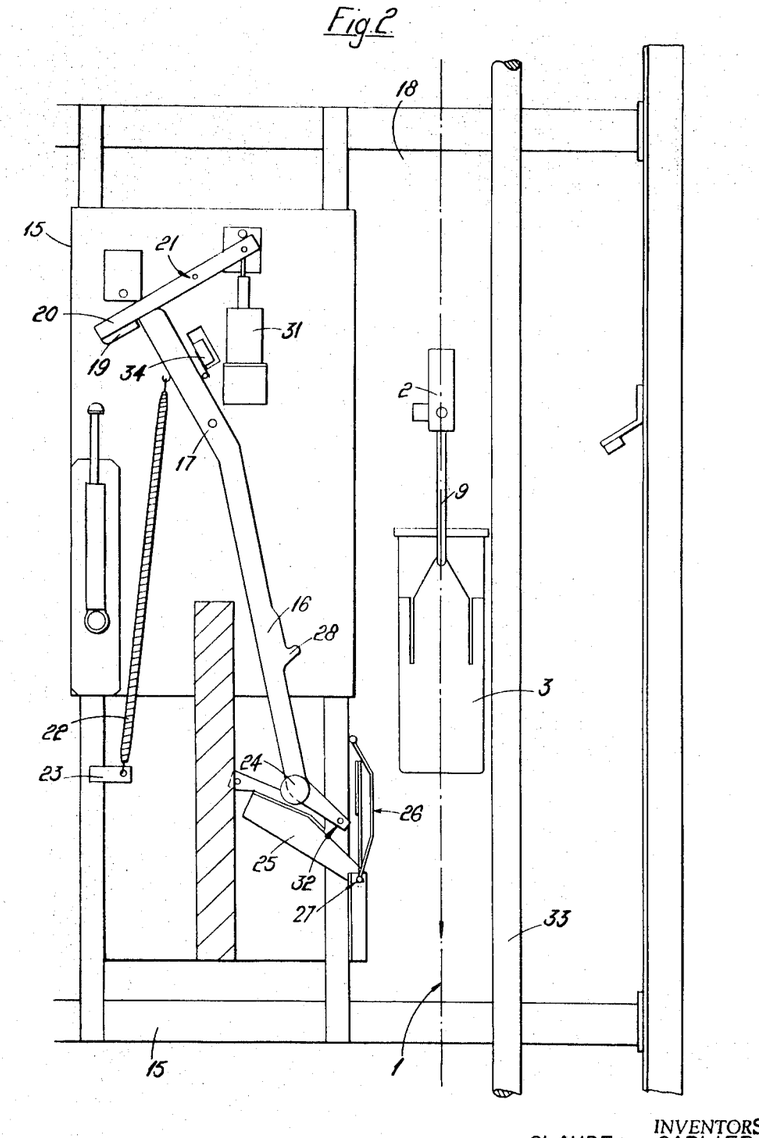
FIG. 2 shows a diagrammatic view, in section, of a discharging station with the transfer mechanism in a position of rest.
Figure 3:
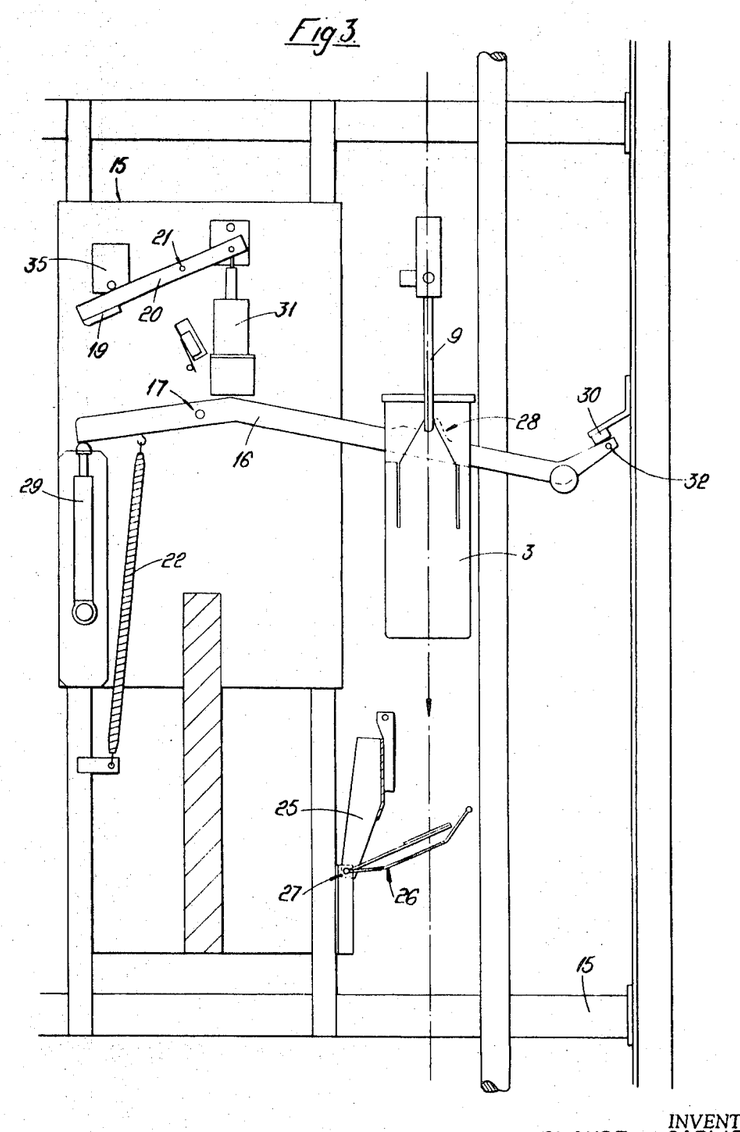
FIG. 3 shows a diagrammatic view, in section, of the same discharging station when a rocker is engaged by the transfer mechanism.

Each story in the building is provided with a transfer mechanism which is shown in greater detail in FIGS. 2 and 3. Each transfer mechanism is mounted securely to the frame 15 of the building adjacent the duct in which descending run of the conveyor travels. Each mechanism includes a transfer arm 16 which is pivotally mounted intermediate its ends to a rod 17, so that the arm 16 may be pivoted between the positions shown in FIGS. 2 and 3. FIG. 2 shows the position of the transfer arm 16 when at rest when the arm 16 is withdrawn from the duct in which boxes 3 descend. The rearward end of the transfer arm 16 bears against an abutment 19 which is secured to the free end of a latching arm to which is pivotable about the rod 21. The latching arm 20 is maintained in the position shown in FIG. 2 by a solenoid 31 which is connected to the other end of the arm 20. When the solenoid is deenergized the arm 20 falls under its own weight, to the lower position shown in FIG. 2 so that the abutment 19 engages the end of the transfer arm 16 and retains it in the position shown. The transfer arm 16 is biased against the abutment 19 by a return spring 22 which is secured, at its ends, to the transfer arm 16 and the frame 15 of the building or elevator.

The other end of the transfer arm 16 is provided with a mechanism adapted to engage and catch a selected descending rocker 2 and box 3. Means are provided at each unloading station for sensing the presence of the selected rocker 2 and box 3. In response to the sensing means the solenoid 31 is actuated to pivot the latching arm 20 and free the end of the transfer arm 16 from engagement with the abutment 19. The spring 22 then causes the transfer arm 16 to swing counterclockwise as shown in FIGS. 2 and 3 to pivot the retrieving end of the transfer arm 16 into the duct into position to engage the selected rocker 2 and box 3. The rotation of the released transfer arm 16 is damped by a conventional damping device 29 and is arrested finally by a stop member 30 which is secured to the frame 15 on the opposite side of the duct as shown in FIG. 3. This insures that the transfer arm 16 will be disposed in the same position, when rotated into the duct to a retrieving position. When in this position the transfer arm 16 is in readiness to receive and engage the selected rocker 2 and box 3 and transfer it from the conveyor.

The mechanism associated with the retrieving end of the transfer arm 16 includes a dog 28 which is formed integrally with the transfer arm 16 and which is intended to engage the cup 13 formed on the arm 9 of the rocker 2. The arm 16 preferably is located in the same plane as the arm 9 of the rocker 2. As the selected box 3 descends, the dog 28 is engaged by and retained within the cup 13 and is displaced within the cup in camlike fashion during the discharging movement. After engagement of the dog 28 with the cup 13, continued downward movement of the chains 1 causes the transfer arm 16 to pivot about the rod 17 while the rocker 2 has a combined rotatary motion about the shaft 7, due to its engagement with the dog 28, and linear movement due to the downward advancement of the chains 1. The positions of the various elements during this motion is shown diagrammatically at phases $f$ and $g$ in FIG. 1. Thus, as shown in phase $f$ of FIG. 1, when the transfer arm 16 is in the intermediate position shown, the rocker 2 has rotated and the box 3 has been displaced from the duct toward the landing of the particular story. This compound movement continues until phase $g$ is reached at which time the box 3 has been placed on the discharge floor while the rocker 2 is disposed in a substantially horizontal position. Continued downward movement of the chains 1 causes the dog 28 to be retracted from the cup 13 on the arm 9 thus releasing the rocker 2 which then returns to the vertically disposed position indicated diagrammatically at the loading phase $a$ in FIG. 1. The weight of the box 3 thus returns the transfer arm 16 to its initial position of rest in which the arm 16 again becomes locked by the abutment 19 in the position shown in FIG. 2.

The unloading device includes a number of safety features. One of these features resides in the provision of a rake 26 which is effective to close temporarily the discharge duct in case the dog 28 of the transfer arm 16 does not engage properly the cup 13 on the selected rocker 2. Additionally, the rake 26 is effective to prevent a discharged box from swinging back into the duct. The rake is secured to a lever 25 which is pivoted to the frame 15 at the pin 27. The lever 25 and rake 26 are pivotable in unison between the extreme positions shown in FIGS. 2 and 3. The lever 25 and rake 26 are biased in the position shown in FIG. 3 by a return spring (not shown) so that the rake 26 protrudes into the duct in which the boxes 3 are conveyed. The rake 26 is normally retained in an unobstructing position shown in FIG. 2 by means of a roller which is mounted to the retrieving end of the transfer arm 16. When the arm is in an inoperative position as in FIG. 2, the roller 24 engages the lever 25 and maintains the rake 26 in the inoperative position. When the transfer arm 16 is released the lever 25 and the rake 26 will be released and the rake will be released and the rake will spring into the conveying duct. Additionally, as the box 3 is withdrawn from the duct the rake 26 engages a side of the box to insure that the box 3 will not swing back into the duct as shown in phases $f$ and $g$ of FIG. 1.

An additional safety feature resides in the provision of a safety microswitch 34 which is actuated by engagement of the transfer arm 16 when in the rest position shown in FIG. 2. The microswitch 34 is incorporated into the control circuitry of the conveyor to cause the chains to stop if the arm 16 moves out of its rest position accidentally.

An additional feature of the invention resides in the provision of a small helical spring 32 which is secured to the end of the transfer arm 16 and which extends normally to the plane of the drawings. This spring serves as an abutment for the outer face of box 3 which is being discharged to limit any oscillatory movement of the box particularly at the end of the discharging operation. Additionally, swinging of the boxes 3 in the duct may be limited by vertical guide 33 disposed in the duct.

Figure 1:
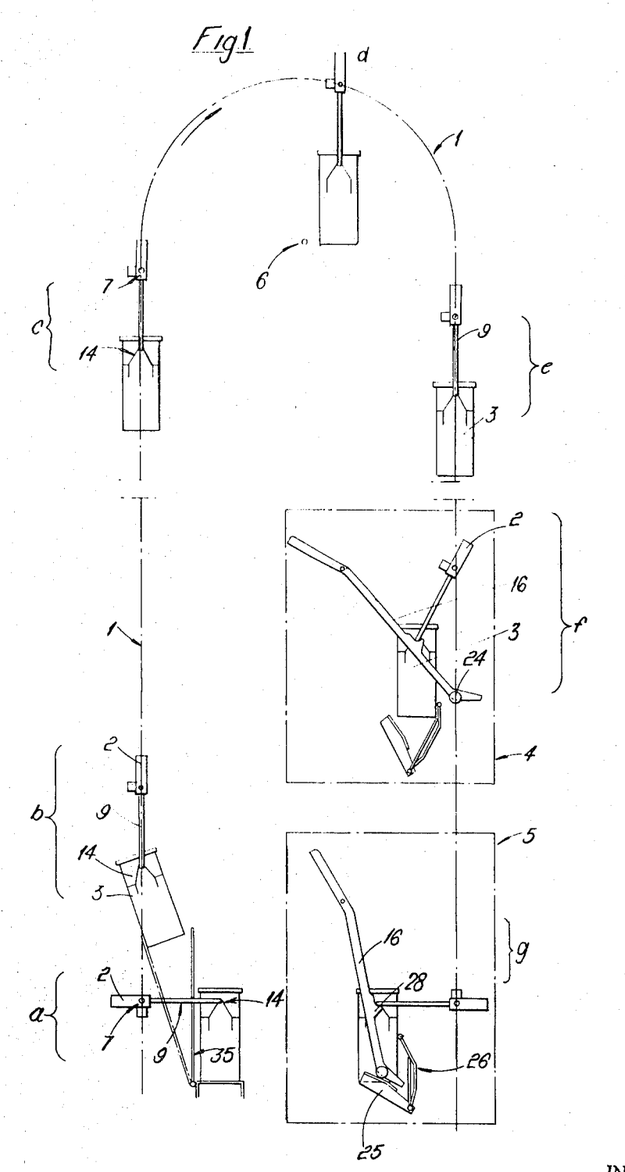
FIG. 1 shows a diagrammatic view, in side elevation, of an elevator according to the invention.

FIG. 1 shows the various phases of loading, conveying and unloading a box 3 by means of the invention, the various phases being indicated by the letter $a$ to $z$. The conveyor is loaded at phase $a$ by placing a box 3 on a loading platform so that its loops 14 are disposed in readiness to be engaged by the horizontally disposed arms of an unloaded and horizontal disposed rocker 2. Phase $b$ shows engagement of the rocker 2 with the loop 14 with the box 3 being removed from the loading platform. Swinging motion of the box 3 during this phase may be damped by any conventional device, for example, by an inclinable guide place 35. Phases $c$, $d$ and $e$ show the travel of the boxes 3 with the rockers 2 in a vertical disposition until the boxes are conveyed to the discharging stations.

The transfer of selected boxes to selected transfer stations is controlled by an index reading device (not shown) which is arranged at the upper portion of the frame of each story of the building. This reading device consists of brushes which rub against the mobile index studs of the boxes as they approach each discharging station. If the code index on the box does not correspond to that of the particular station (as is the case in FIG. 2) the discharge mechanism will not be triggered and the rocker 2, with its supported box 3 will pass downwardly past that story. If the code does correspond to that of the station in question, the various elements of the unloading mechanism are actuated to the position shown in FIG. 3 to catch the rocker and retrieve the box a very short time after the box has passed the index reader. The contact between the box and the index reader causes the solenoid 31 to be actuated which pivots the lever 20 and releases the transfer arm 16 so that it will swing to its horizontal position in the duct. As described earlier this position is limited by engagement with the stop 30 and the movement of the transfer arm 16 is damped by the damping device 29. The dog 28 of the arm 16 then is disposed in precise alignment with the cup 13 which is then engaged as described above. It should be noted that if, for any reason, the arm 16 leaves its position of rest before the index reader has caused actuation of the solenoid to unlock the arm, the safety microswitch 34 will act to interrupt the operation of the conveyor and/or to signal the unforeseen release of the arm at the level in question.

Figure 6:
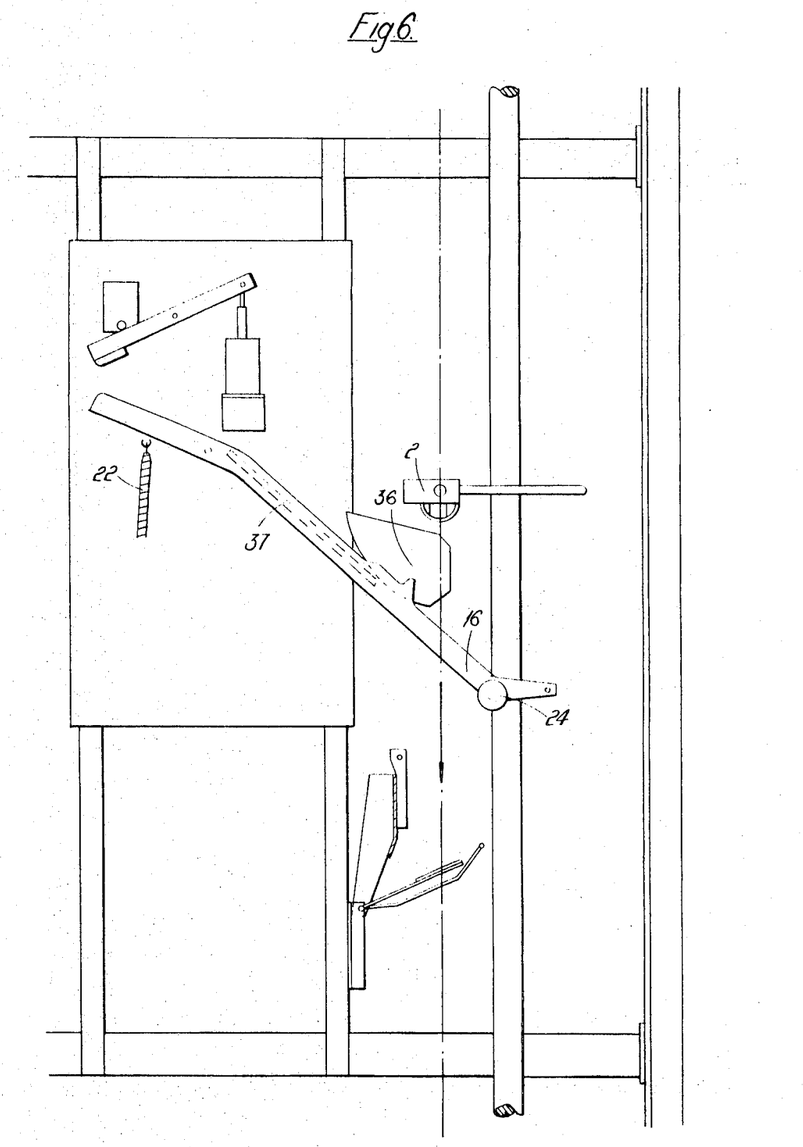
FIG. 6 is a illustration of the transfer station shown in FIG. 5 illustrating operation of the safety device.
Figure 7:
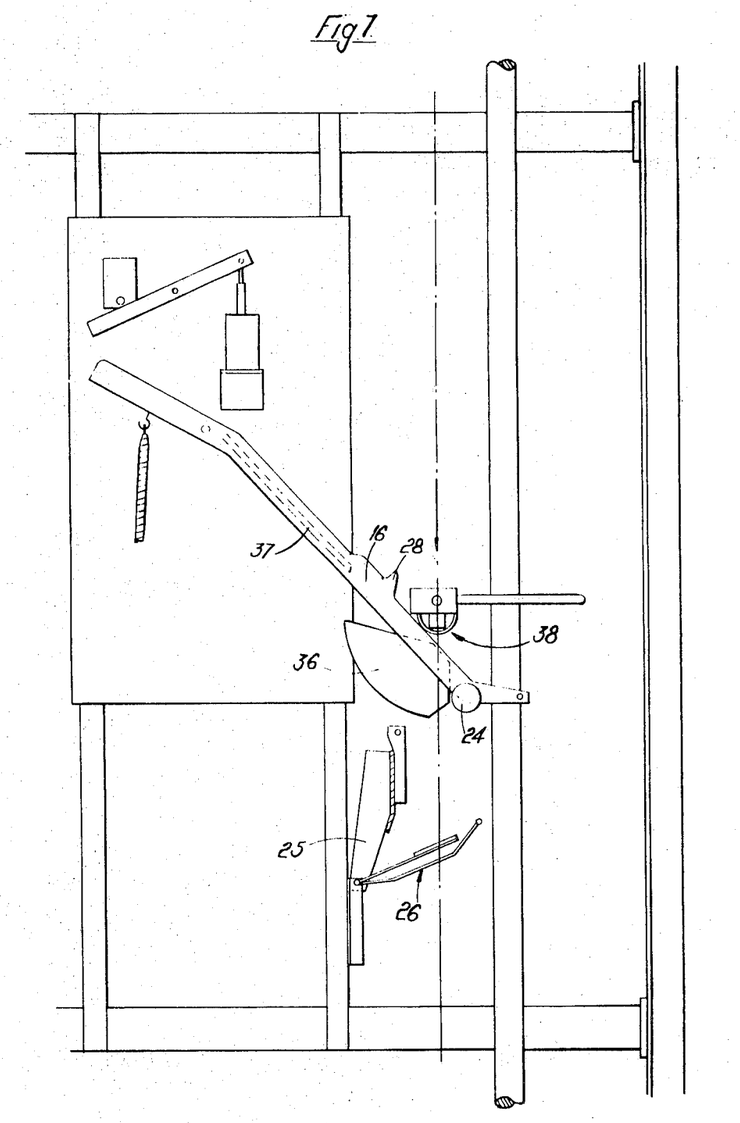
FIG. 7 is a view similar to FIG. 5 illustrating further operation of the safety device.
Figure 8:
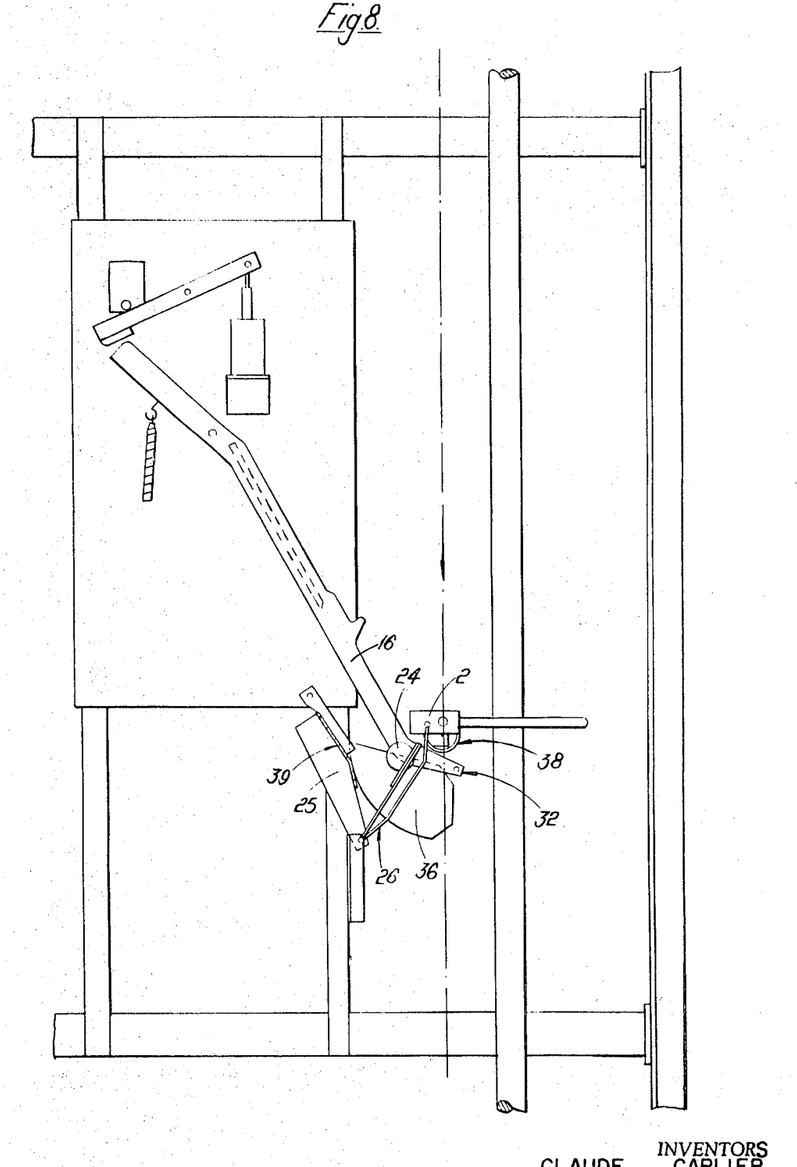

An additional safety mechanism is shown in FIGS. 5 to 8 for precluding the transfer arm 16 and rake 26 from being disposed in a retrieving position when an unloaded, horizontally disposed rocker 2 passes and, in the event that the microswitch 34 has failed to stop the conveyor. This arrangement includes a rounded plate 36 which is secured to the chain for movement therewith and which is engageable with a rib 37 formed on the transfer arm 16. As shown in FIG. 6, when the descending plate 36 engages the rib 37, the transfer arm 16 will be rotated until the plate 36 slides off the rib. A rounded shield 38 is secured to the rocker 2 so that when the rocker is in the horizontal position, continued downward movement of the chain will cause the shield 38 to engage the transfer arm 16 in proximity to the roller 24. Continued downward movement causes the plate 36 to then engage a pedal 39 secured to the lever 25 (FIG. 8) to rotate the transfer arm 16 out of the path of the downwardly advancing rocker 2. The plate 36 displaces the pedal 39 until the rocker 2 has passed clear of the rake 26. This process is repeated with each succeeding unloaded rocker until the next, loaded rocker arrives at which time the attached box 3 will be engaged and retrieved from the duct. The plate 36 and shield 38 are easy to construct and attach and do not affect the normal operation of the system. A further safety feature may be obtained by arranging the spring 32 on the end of the transfer arm 16 so that it may bear on the rake 26 to hold it out of the path of unloaded rocker.

Thus we have provided an arrangement in which the dog 28 engages the rocker at the point of suspension of the box so that the position of the center of gravity loaded box does not affect the discharging operation. This feature is particularly advantageous if it is desired to transport heavier loads. Boxes of larger dimensions may be employed and the loads placed in these boxes may be varied and have a center of gravity dependent on the volume of the article which is to be transported. The larger the dimensions of the box the more indeterminate will the position of the center of gravity of the load be. The system, according to the invention, therefore is particularly suitable for handling of such loads. The spring 32 provided on the arm 16 also makes it possible to limit the inclination of the box during the discharging operation.

It should be understood that the foregoing description is intended merely to be illustrative of our invention and other embodiments and modifications will be apparent to those skilled in the art without departing from its spirit.

Having thus described our invention what we desire to claim and secure by Letter Patent is:

1. A material-handling apparatus for loading, transporting and unloading containers at various levels comprising:
   a paternoster elevator having an endless chain;
   at least one rocker secured to said chain for movement therewith, said rocker being adapted to engage and support said boxes for movement in unison therewith along the path of travel of said chain;
   a transfer mechanism located at each level adjacent the path of travel of said chain, said transfer mechanism including a transfer arm mounted to said frame for movement between a remote position and a retrieving position in which said arm is disposed in the path of a descending rocker supporting a container, said transfer arm being engageable with said rocker to rotate said rocker towards said discharge station and to discharge said container laterally thereto.

2. An apparatus as defined in claim 1 wherein said transfer arm engages said rocker at a location in alignment with the point of suspension of said rocker with said container.

3. An apparatus as defined in claim 1 wherein said transfer arm is pivotally mounted to said frame for movement into the path of said descending rocker to engage said rocker.

4. An apparatus as defined in claim 3 wherein said pivoting arm engages said rocker in alignment with the point of suspension of said container.

5. An apparatus as defined in claim 4 wherein said arm has a dog formed integrally therewith, said dog being engageable with a cup mounted to said rocker, said arm being pivotable to effect rotation of said rocker towards said discharge station, said dog being disengageable from said rocker after said rocker has been rotated to discharge said container.

6. An apparatus as defined in claim 1 wherein said arm has a dog formed integrally therewith, said dog being engageable with a cup mounted to said rocker, said arm being pivotable to effect rotation of said rocker towards said discharge station, said dog being disengageable from said rocker after said rocker has been rotated to discharge said container.

7. An apparatus as defined in claim 1 wherein said transfer arm is pivotally mounted to said frame for movement into the path of said descending rocker to engage said rocker, said apparatus further comprising:
   a safety rake pivotally mounted to said frame below said pivotable arm and into the path of movement of said descending rocker;
   said rake being engageable with said container to be retrieved to aid in guiding said container toward said discharge station.

8. An apparatus as defined in claim 5 wherein said transfer arm engages said rocker at its point of suspension of said container.

9. An apparatus as defined in claim 8 wherein the pivoting arm has a dog for engagement with a cup secured to said rocker, said dog and cup being disengageable as said rocker is pivoted toward said discharge station.

10. An apparatus as defined in claim 1 wherein said transfer arm is pivotally mounted to said frame for movement into the path of said descending rocker to engage said rocker, said apparatus further comprising:
    a safety rake pivotally mounted to said frame below said transfer arm for pivoted movement into the path of said container;
    means connecting said rake to said pivotable arm to maintain the rake in a remote position when said transfer arm is in said remote position; and
    means responsive to movement of said transfer arm to said retrieving position to move said rake into the path of movement of said container.

11. An apparatus as defined in claim 1 wherein said transfer arm is pivotally mounted to said frame for movement into the path of said descending rocker to engage said rocker, said apparatus further comprising:
    means for biasing said transfer arm into said operative position;
    latching means mounted to said frame and being engageable with said transfer arm to retain said transfer arm in said idle position in opposition to said biases means; and
    means for releasing said latching means to enable said biases means to rotate said transfer arm into said operative position.

12. An apparatus as defined in claim 11 further comprising:
    stop means for limiting the extent of movement of said transfer arm; and
    damping means engageable with said transfer arm as it is rotated to said operative position.

13. An apparatus as defined in claim 1 wherein said transfer arm is pivotally mounted to said frame for movement into the path of said descending rocker to engage said rocker, said apparatus further comprising:
    spring means secured to the end of said transfer arm to engage said retrieved container and to damp vibrations of said container during retrieval.

14. An apparatus as defined in claim 1 wherein said transfer arm is pivotally mounted to said frame for movement into the path of said descending rocker to engage said rocker, said apparatus further comprising:
    safety control means engageable with said transfer arm for sensing the presence of said transfer arm in said remote position;
    said safety control means being responsive to inadvertent release of said transfer arm from said remote position to stop operation of said elevator.

15. An apparatus as defined in claim 14 further comprising:
    additional safety means secured to and carried by said chain, said means being engageable with a transfer arm inadvertently disposed in said retrieving position, to urge said arm towards said remote position and out of the path of travel of said rocker in response to continued downward movement of said rocker and chain.

16. An apparatus as defined in claim 15 wherein said safety means comprises:
    a cam secured to said chain below the point of attachment of its associated rocker to said chain;
    said rocker including a convex surface arranged in the same vertical plane as said cam, said transfer arm having a rib disposed in the same vertical plane as said cam and convex surface;
    said convex surface of said rocker being presented to said rib only when said rocker is unloaded and in a generally horizontal position;
    said cam and said convex surface being effective to engage successively said rib as said chain continues its downward movement to urge said transfer arm toward said remote position.

17. An apparatus as defined in claim 1 further comprising:
    a cam secured to said chain below the point of attachment of its associated rocker to said chain;
    said rocker including a convex surface arranged in the same vertical plane as said cam, said transfer arm having a rib disposed in the same vertical plane as said cam and convex surface;
    said convex surface of said rocker being presented to said rib only when said rocker is unloaded and in a generally horizontal position;
    said cam and said convex surface being effective to engage successively said rib as said chain continues its downward movement to urge said transfer arm toward said remote position.